$$e_1 = a\cos t/RC + b\sin t/RC$$
$$1\ PERIOD = T = 2\pi RC$$

INVENTOR.
Robert J. McCurdy

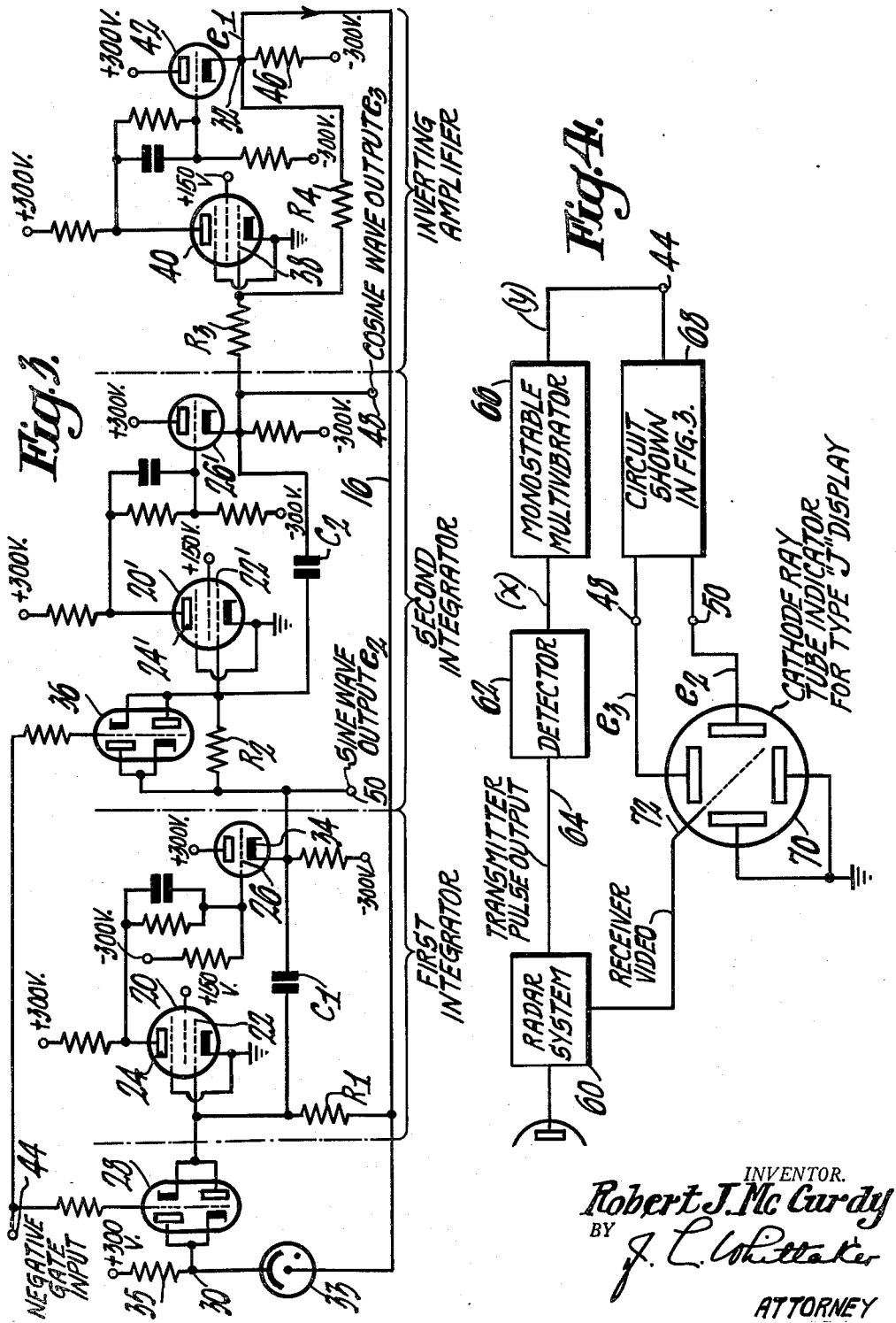

July 4, 1961  R. J. McCURDY  2,991,469
RADAR TEST SET
Filed Oct. 31, 1955  3 Sheets-Sheet 3
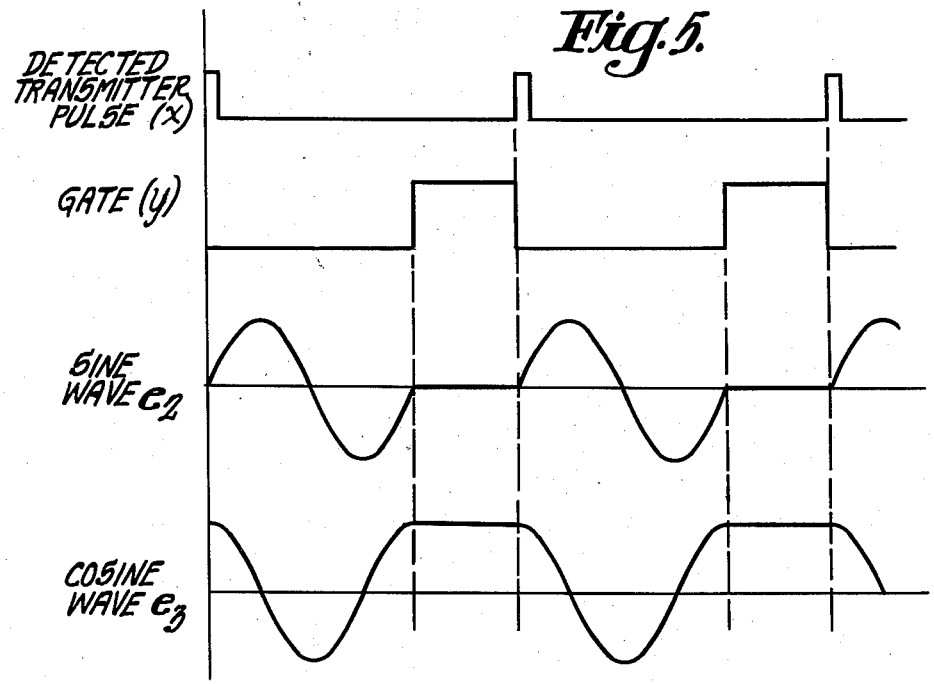
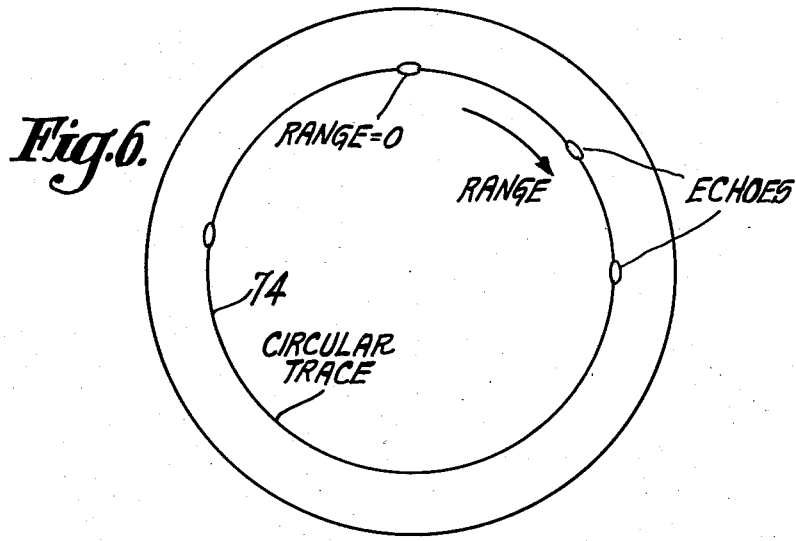
INVENTOR.
Robert J. McCurdy
BY J. C. Whittaker
ATTORNEY

United States Patent Office 2,991,469
Patented July 4, 1961

2,991,469
RADAR TEST SET
Robert J. McCurdy, Haddonfield, N.J., assignor to Radio Corporation of America, a corporation of Delaware
Filed Oct. 31, 1955, Ser. No. 543,688
5 Claims. (Cl. 343—17.7)

The present invention relates to an oscillator of improved design, which is particularly useful for generating circular sweep deflection voltages for cathode ray tube indicaters.

It is a general object of the present invention to provide an improved, inherently stable, resistor-condenser oscillator.

It is another object of the invention to provide an oscillator having substantially no starting transient for producing a wave the first cycle of which is of substantially the same shape as subsequent cycles.

It is another object of the invention to provide an improved oscillator which may be started in oscillation in any phase relative to a reference phase.

It is another object of the invention to provide an oscillator which delivers a sinusoidal and cosinusoidal wave simultaneously.

Yet another object of the invention is to provide an improved test-set which is especially useful for testing radar systems employing so-called "type J" displays.

A typical embodiment of the invention includes a first integrator circuit and a second integrator circuit connected to integrate the output wave of the first integrator circuit. An inverting amplifier receives the output wave of the second integrator circuit and, in turn, supplies its output as the input wave to the first integrator circuit.

In a preferred form of the invention, means are provided for clamping the initial level to which the storage means of the integrator circuits are charged. A gate pulse applied to the clamping means effectively removes such means from the circuit, whereby the arrangement described in the preceding paragraph begins to oscillate. The output wave of the first integrator circuit means may comprise a sinusoidal wave, whereby the output wave of the second integrator circuit means will comprise a cosinusoidal wave. The levels to which the storage devices of the integration circuits are initially clamped determine the starting phase of the sinusoidal wave and accordingly the starting phase of the cosinusoidal wave.

The invention will be described in greater detail by reference to the following description taken in connection with the accompanying drawing in which:

FIGURE 3 is a schematic circuit diagram of the arrangement shown in FIGURE 1;

FIGURE 4 is a block circuit diagram of a radar test-set according to the present invention;

FIGURE 5 is a drawing of the waveforms present at various points in the circuits of FIGURES 1, 3 and 4; and FIGURE 6 is a drawing of the display produced in the test-set of FIGURE 4.

Similar reference numerals are applied to similar circuit elements throughout the figures.

Figure 1:
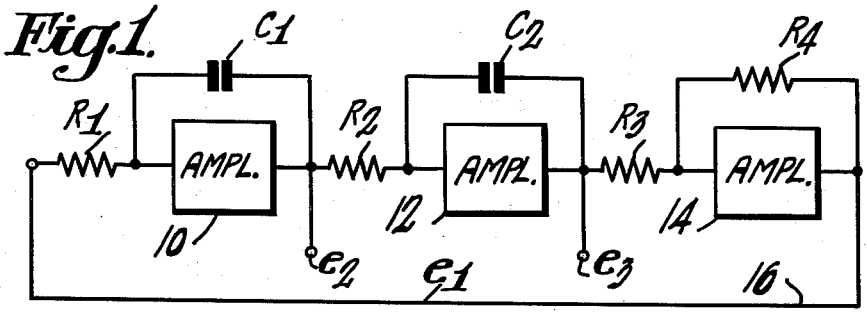
FIGURE 1 is a functional diagram of a preferred form of the invention.

Referring to FIGURE 1, the circuit of the invention includes a first integrator circuit including amplifier 10, resistor $R_1$ and condenser $C_1$; and a second integrator circuit including amplifier 12, resistor $R_2$, and condenser $C_2$. The output of the second integrator circuit is inverted in a unity-gain, feedback amplifier 14 and applied over lead 16 into the input circuit of the first integrator circuit. Resistor $R_3$ is a coupling resistor and resistor $R_4$ is in the degenerative feedback loop of the amplifier.

In the circuit of FIGURE 1, the output voltage of the first integrator circuit is $e_2$, the output voltage of the second integration circuit is $e_3$, and the output voltage of amplifier 14 is $e_1$. If $R_1=R_2=R$ and $C_1=C_2=C$, the following relationships may be derived:

$$e_2 = -1/RC \int e_1 dt \qquad (1)$$
$$e_3 = -1/RC \int e_2 dt \qquad (2)$$
$$e_1 = -e_3 \qquad (3)$$

Combining the Equations 1, 2, and 3 to eliminate $e_2$ and $e_3$ gives:

$$e_1 = -\frac{1}{R^2C^2}\int\int e_1 dt^2$$

$$e_1 + \frac{1}{R^2C^2}\int\int e_1 dt^2 = 0 \qquad (4)$$

Differentiating Equation 4 twice, gives the following:

$$\frac{d^2e_1}{dt^2} + \frac{e_1}{R^2C^2} = 0 \qquad (5)$$

Equation 5 is a differential equation for simple harmonic vibration. Solution of this equation yields the following expression for $e_1$ (see pages 388 and 389 of the 1941 edition of "Elements of the Differential and Integral Calculus" by Granville, Smith, and Longley):

$$e_1 = a \cos t/RC + b \sin t/RC \qquad (6)$$

The period T of the resultant voltage $e_1$ is:

$$T = 2\pi RC \qquad (7)$$

Figure 2:
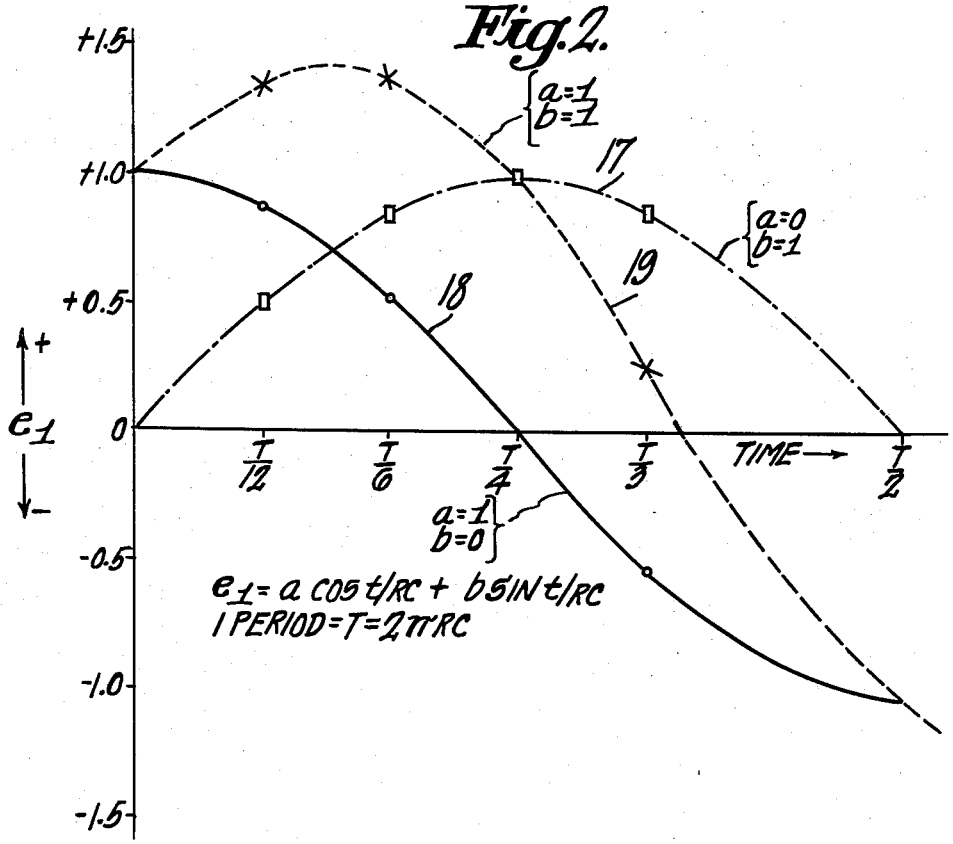
FIGURE 2 is a graph showing a number of different output waves it is possible to derive from the circuit of FIGURE 1.

The initial phase of $e_1$ can be adjusted to any predetermined value by choosing different values of $a$ and $b$. For example, if $a=0$ and $b=1$, the wave 17 shown by the dot-dash line in FIGURE 2 will be obtained; if $a=1$ and $b=0$, wave 18 shown by the solid line in FIGURE 2 will be obtained; and if $a=1$ and $b=1$, wave 19 shown by the dashed line in FIGURE 2 will be obtained. Thus, if the initial phase of wave 17 is 0° the second wave 18 leads wave 17 by 90°, and the third wave 19 ($a=1$, $b=1$) leads wave 17 by 45°. The specific values of $a$ and $b$ chosen above are merely illustrative of the invention. The general expression for the initial phase $\theta$ of $e$ is:

$$\theta = \tan^{-1} a/b \qquad (7a)$$

FIGURE 3 is a schematic circuit diagram of a practical circuit according to the invention. The first integrator comprises a so-called "Miller" integrator. It includes a pentode 20 having a control grid 22 and an anode 24. Storage capacitor $C_1$ is connected between control grid 22 and anode 24 via cathode follower 26. The cathode follower acts as a coupling device having a relatively high impedance input circuit (the anode circuit of the pentode) and a relatively low impedance output circuit (the grid circuit of the pentode). Dual triode 28 is a clamping device which normally conducts and thereby normally maintains control grid 22 at the potential of point 30. In the form of the invention illustrated, this potential is maintained at a predetermined value of +87 volts with respect to the cathode of the cathode follower 42 (junction 32) by means of cold cathode gas tube 33. It is to be understood that control grid 22 can be maintained at any other reference level desired by other forms of constant voltage output devices such as, for example, voltage regulator tubes or even batteries. The value to which this control grid is clamped is the negative value of the "$a$" term of equation 6.

The second integrator circuit is similar to the one described in the preceding paragraph and the same reference numerals primed are applied to analagous components. In the circuit illustrated, the control grid 22' of pentode 20' is normally clamped to the voltage level of the cathode 34 (the output connection of the first integrator) by means of oppositely connected triodes 36. These are connected across charging resistor $R_2$ and normally effectively short circuit the charging resistor. The output voltage of the second integrator is applied via coupling resistor $R_3$ to control grid 38 of amplifier 40. As in the case of the integrator, cathode follower 42 is inserted in the feedback loop for impedance matching purposes. The inverting amplifier is a stable, unity-gain device. The output of amplifier 40 which is available at the cathode connection 32 of cathode follower 42 is fed back via lead 16 and resistor $R_1$ to control grid 22 of the first integrator.

In operation, clampers 28 and 36 normally conduct. Amplifier 20 conducts and charges storage capacitor $C_1$ to a predetermined level. At the same time, amplifier 20' conducts and charges storage capacitor $C_2$ to another predetermined level. These are determined by the operating potentials applied to the respective amplifiers and the respective levels to which the control grids and storage capacitors are clamped. When it is desired to make the system oscillate, a negative gate pulse of sufficient amplitude to drive clamper triodes 28 and 36 to cutoff is applied to terminal 44. It can be seen in a qualitative way that when clamper 28 is cut off, the bias voltage applied to control grid 22 of pentode amplifier 20 will become more negative (it will tend to be equal to −300 volts less the voltage drop across the cathode resistor 46 of cathode follower 42), whereby the plate current drawn by pentode 20 decreases and its plate voltage increases. The voltage at the cathode 34 of cathode follower 26 thereby becomes more positive. Pentode amplifier 20' now draws more plate current. This in turn causes the anode voltage of the pentode to become more negative, whereby the voltage available at output terminal 48 becomes more negative.

Mathematical expressions for the waves available at terminals 50 (wave $e_2$), 48 (wave $e_3$) and 32 (wave $e_1$) may be derived from Equations 1, 2, and 6. Referring first to Equation 6, clamper 28 maintains junction 32 at −87 volts with respect to the control grid 22 of the first integrator. This is the "$a$" term of the equation. The output terminal 50 of the first integrator is maintained at 0 volts with respect to the input circuit to the second integrator by clamp 36. This is the "$b$" term of Equation 6. Substituting in Equation 6 gives:

$$e_1 = -87 \cos t/RC \quad (8)$$

Substituting Equation 8 in Equation 1 gives:

$$e_2 = -1/RC \int -87 \cos t/RC \, dt$$
$$e_2 = 87 \sin t/RC \quad (9)$$

Substituting Equation 9 in Equation 2 gives:

$$e_3 = -1/RC \int -87 \cos t/RC \, dt$$
$$e_3 = 87 \cos t/RC \quad (10)$$

From the discussion in connection with FIGURE 1, it can be seen that the initial phase of oscillation $e_1$ and thereby oscillations $e_2$ and $e_3$ can readily be adjusted by changing the values of $a$ and $b$. These in turn are functions of the levels to which the input circuits to the integrators are clamped at T=0 (the time immediately before the gates are applied which cause the circuit to start oscillating). The frequency of oscillations $e_1$, $e_2$, $e_3$ may be controlled by adjustment of R, or C, or both R and C. This is self-evident from Equation 7.

The above-mentioned oscillator is extremely stable. During the clamping time stability is achieved by using D.C. coupling throughout, and by arranging the clamps to maintain a closed feedback loop. By maintaining stability in this way, the clamps may be gated off with substantially no transients resulting. When the clamps are open, voltages $e_2$ and $e_3$ will begin to change as described above and will trace out sine and cosine waves until the clamps are again closed. In a form of the invention to be described in more detail later, the clamps are opened for a time equal to the period of one oscillation, however, in other forms of the invention the clamps may be held open for any length of time desired, either more than or less than the time required for one period.

The circuit of FIGURE 3 has numerous and important advantages. For one thing, the oscillations may be made to start at any predetermined phase. For another, the circuit is stable and there are substantially no starting transients. This is important when only the first cycle is of interest, as in the case of a triggered circular sweep. Another advantage is that when the clamps are closed, the integrating action is stopped and the oscillation is damped out very quickly. Still another advantage is that low frequencies may be obtained without the use of large reactive components.

A practical circuit designed as shown in FIGURE 3 may include the following elements:

Tubes 28 and 36_____ Type 12AU7.
Tubes 20, 20' and 40_____ Type 6AU6.
Tubes 26, 26' and 42_____ Type 12AT7.
Tube 33_____ Type 5651.
Resistors $R_1$, $R_2$, $R_3$ and $R_4$.100,000 ohms each.
Condensers $C_1$ and $C_2$___ 2200 micro-microfarads each.
Resistor 35_____ 33,000 ohms.
Resistor 46_____ 47,000 ohms.

Referring to FIGURE 4, radar system 60 may be of the type having a central time base from which both the transmitter trigger pulses and the cathode ray tube sweep potentials are derived. In the case of a radar system employing a "type J" display, for example, the central time base may be a sine wave oscillator the output of which is applied directly to the horizontal deflecting plates of the oscilloscope. The sine wave is also phase shifted 90° and applied to the vertical deflection plates of the oscilloscope. The sine wave is also applied to a pulse former such as a phantastron, multivibrator, or the like, which derives from the sine wave, transmitter triggering pulses. The circuit shown in FIGURE 4 is especially adapted for testing such a system. It displays echoes received by the radar system and it may be synchronized with the radar system by the radar transmitter pulses or the radar transmitter trigger pulses. It need not be connected to the central time base circuits of the radar system and this is advantageous since such connection might be difficult to make and might affect the pulse repetition frequency of the radar system by unduly loading these circuits.

Still referring to FIGURE 4, detector 62 is connected via lead 64 to a portion of the radar system through which radio frequency pulses pass. For example, lead 64 may lead to a probe in the output waveguide of the radar system. The detector demodulates the pulses and applies them as triggering signals $x$ to the input circuit of monostable multivibrator 66. The output of the monostable multivibrator consists of negative-going gate pulses $y$ such as shown in FIGURE 5 and these are applied to terminal 44 of circuit 68 (shown in detail in FIGURE 3). Voltage $e_3$ available at output terminal 48 is applied to the vertical deflection plates of cathode ray tube indicator 70 and voltage $e_2$ available at terminal 50 is applied to the horizontal deflection plates of the indicator. Video information from the radar receiver is applied over lead 72 to the control grid of the cathode ray tube indicator. The resultant display is as shown in FIGURE 6. Each time a radar pulse is transmitted negative gate $y$, which is exactly one sine wave period long, is applied to terminal 44, and clamps 28 and 36 (FIGURE 3) are opened. One cycle of sine wave is produced at terminal 50 and one cycle of cosine wave is produced at terminal 48. A circular trace 74 (FIGURE 6) is produced in response to each transmitter pulse.

Although not shown in FIGURE 3, resistors $R_1$ and $R_2$ may be made adjustable and ganged and, in like manner, condensers $C_1$ and $C_2$ may also be made adjustable and ganged. This permits the frequency of the sine and cosine waves to be adjusted. Preferably, monostable multivibrator 66 is also made adjustable to permit the duration of negative gate (y) to be adjusted to a value sufficient to permit one complete cycle of oscillator operation. The period to which waves $e_2$ and $e_3$ are adjusted determines the range displayed on the indicator of FIGURE 6. Thus, the lower the frequency, the greater the range and vice-versa.

What is claimed is:

1. A test-set for a radar system of the type including transmitter means for transmitting pulses to reflecting objects and receiver means for detecting pulses reflected from said objects, in combination, means for detecting said transmitted pulses; means responsive to said detected pulses for producing gate pulses having a duration equal to a radar range of interest; resistor-condenser oscillator means responsive to said gate pulses for simultaneously producing a sinusoidal wave and a cosinusoidal wave, both of which have a period equal to that of the duration of said gate pulses; and cathode ray tube indicator means including means for producing an electron beam, first deflecting means for deflecting said beam along one coordinate of the screen of said indicator means, second deflecting means for deflecting said beam along another coordinate of the screen of said indicator means, and modulating means for modulating said beam, said sinusoidal signal being applied to said first deflecting means, said cosinusoidal signal being applied to said second deflecting means, and said modulating means being adapted to respond to said detected pulses, and wherein said resistor-condenser oscillator comprises first integrator circuit means; second integrator circuit means connected to receive the output of said first integrator circuit means for integrating said output; and means for inverting the output of said second integrator circuit means and supplying said output as the input to said first integrator circuit means, said sinusoidal signal being available at the output of one integrator circuit means, and said cosinusoidal output being available at the output of the other of said integrator circuit means.

2. An oscillator comprising, in combination, first integrator circuit means including a charge storing means; second integrator circuit means connected to receive the output of said first integrator circuit means for integrating said output, said second integrating means including a charge storing means; means for inverting the output voltage of said second integrator circuit means and supplying said inverted output voltage as the input voltage to said first integrator circuit means; means coupled to said first and second integrator circuit means for maintaining the charges stored therein at predetermined levels and thereby preventing said oscillator from oscillating; and means for effectively removing said last-named circuit means from the circuit and thereby permitting said oscillator to oscillate.

3. An oscillator as set forth in claim 2, further including means for adjusting the initial phase of the output voltage of said first integrator circuit means.

4. An oscillator as set forth in claim 3, wherein said means for adjusting said phase comprises means for adjusting the level to which the charge storing means of said first integrator circuit is charged before said oscillator begins to oscillate.

5. An oscillator comprising, in combination, a first integrator including a first electron discharge device having at least an anode and control element, and a storage device coupled between said anode and control element; a second integrator including a second electron discharge device having at least an anode and a control element, and a storage device connected between said second device control element and said second device anode, the control element of said second discharge device being connected to receive the output wave of said first integrator; an inverting amplifier including a third electron discharge device having a control element connected to receive the output wave of said second integrator, and an anode; connection means for coupling the anode of said third discharge device to the control element of said first discharge device for supplying the output wave of said amplifier as the input wave to said first integrator; clamping means coupled to the control electrode of said first discharge device for clamping said first device control electrode to a predetermined voltage level; clamping means coupled to the control electrode of said second discharge device for clamping said second device electrode to a predetermined voltage level; and means for rendering said clamping means inoperative during intervals it is desired to derive oscillations from said oscillator.

References Cited in the file of this patent

UNITED STATES PATENTS

| | | |
|---|---|---|
| 1,924,156 | Hart | Aug. 29, 1933 |
| 2,227,598 | Lyman et al. | Jan. 7, 1941 |
| 2,520,595 | Fernsler | Aug. 29, 1950 |
| 2,605,461 | Koehler | July 29, 1952 |
| 2,621,292 | White | Dec. 9, 1952 |
| 2,776,423 | Richardson | Jan. 1, 1957 |

FOREIGN PATENTS

| | | |
|---|---|---|
| 163,219 | Australia | June 6, 1955 |
| 781,374 | Great Britain | Aug. 21, 1957 |

OTHER REFERENCES

Corcos et al.: "Application of Electronic Differential Analyzer to Eig on Value Problems," pp. 17–24.

Bell et al.: "Precision in High-Speed Electronic Differential Analyzers," pp. 61–79 (pp. 63 and 69 relied on). Both articles are in Cyclone Symposium II, part 2, April 28–May 2, 1952.

Greenwood et al.: "Electronic Instruments," Radiation Lab. Series, vol. 21, 1948, pp. 79–82.

Dorn et al.: Electric Analog Computer," McGraw-Hill Book Co., 1952, pp. 288–294, 343–349 relied on.

An Electronic Voltage Integrator From Review of Scientific Instruments, March 1954 (pp. 275–279).